United States

[11] 3,609,585

[72] Inventor Robert E. Hufnagel
Ridgefield, Conn.
[21] Appl. No. 767,787
[22] Filed Oct. 15, 1968
[45] Patented Sept. 28, 1971
[73] Assignee The Perkin-Elmer Corporation
Norwalk, Conn.

[54] HIGH-POWER LASER INCLUDING MEANS FOR PROVIDING POWER OUTPUT
13 Claims, 4 Drawing Figs.

[52] U.S. Cl. ......................................... 331/94.5, 350/299
[51] Int. Cl. ........................................ H01s 3/08
[50] Field of Search ........................... 331/94.5

[56] References Cited
UNITED STATES PATENTS

| | | | |
|---|---|---|---|
| 3,248,660 | 4/1966 | Fajans | 331/94.5 |
| 3,443,243 | 5/1969 | Patel | 331/94.5 |
| 3,465,358 | 9/1969 | Bridges | 331/94.5 |

FOREIGN PATENTS

| | | | |
|---|---|---|---|
| 984,590 | 2/1965 | Great Britain | 331/94.5 |

OTHER REFERENCES

McClellan et al., " Optical Spectra" July/August 1968, pp. 49– 52
Jeffers, " Applied Physics Letters," 15 Sept. 1967, pp. 178– 180
Gregg et al., " Applied Physics Letters," 15 Feb. 1968, pp. 144– 146

*Primary Examiner*—Roy Lake
*Assistant Examiner*—Darwin R. Hostetter
*Attorney*—Edward R. Hyde, Jr.

ABSTRACT: A laser including a lasing material, exciting means for producing stimulated emission at a power level higher than that which can be tolerated by semitransparent mirrors, and a pair of opaque reflective mirrors defining a resonant optical cavity. The surface of at least one of the mirrors includes a plurality of periodic fluctuations, preferably comprising grooves, separated by flat regions so that the major proportion of an incident beam coaxial with the cavity is reflected back upon itself and a proportion of the incident beam sufficient to provide a useful power output is diffractively reflected to an angle to the axis of the cavity.

PATENTED SEP 28 1971 3,609,585
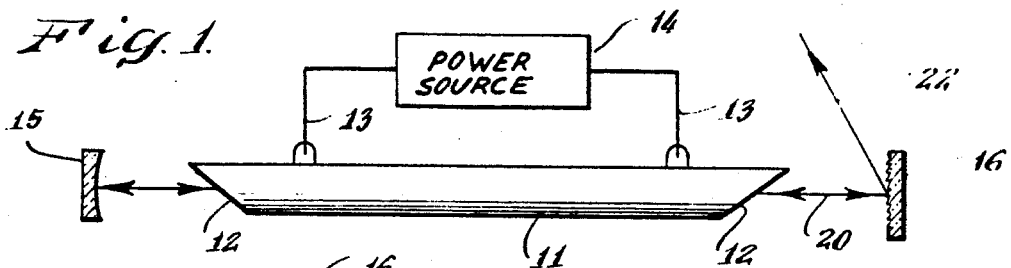
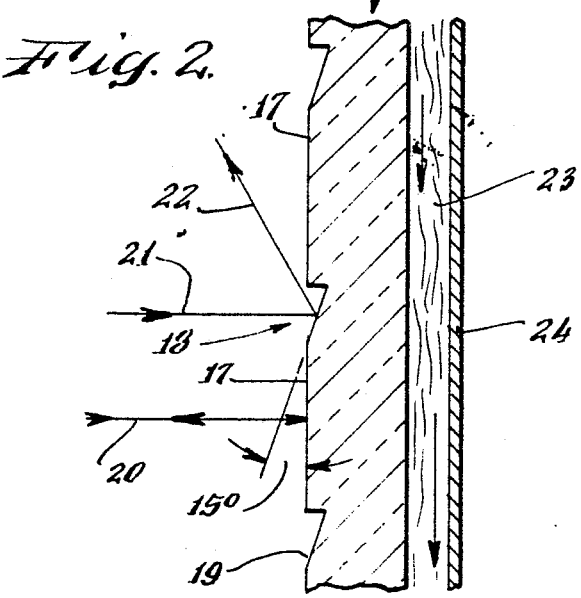
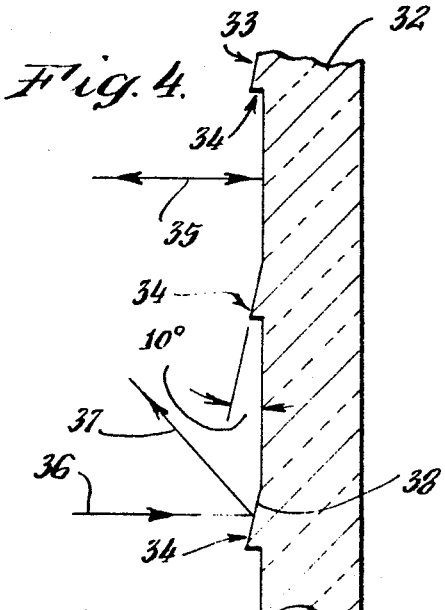
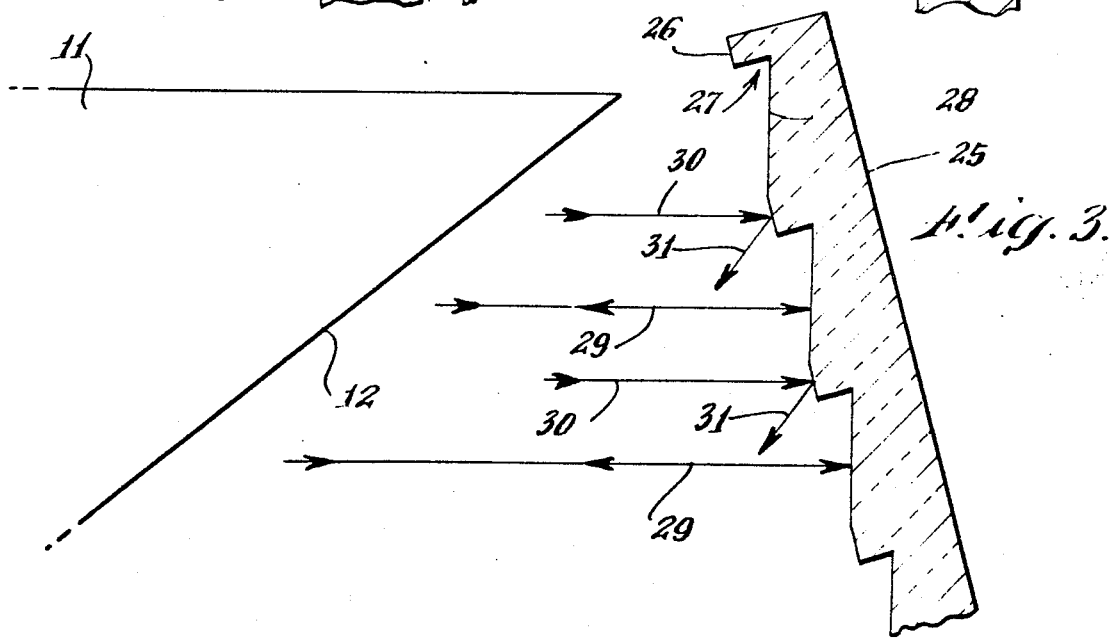
INVENTOR.
Robert E. Hufnagel
BY
Edward D. Murphy
ATTORNEY.

HIGH-POWER LASER INCLUDING MEANS FOR PROVIDING POWER OUTPUT

This invention relates to the field of high-power lasers and is particularly directed to a novel arrangement for defining the resonant cavity and providing a power output.

Conventional lasers include mirrors juxtaposed about the lasing material to define a resonant cavity which are normally fabricated from glass. One of the mirrors is opaque while the other is made partially transmissive so that most of the stimulated emission developed within the cavity is reflected but a portion is transmitted through the mirror to form the power output beam. Lasers have recently been developed which are capable of very high levels of continuous output power, for example, several hundred watts or more. The internal power reflected by the mirrors of these lasers may be many kilowatts. It is extremely difficult, if not impossible, to provide semitransparent mirrors which can withstand such power levels, particularly since such lasers usually operate at frequencies which are readily absorbed by most materials. Accordingly, it is necessary to provide another method of obtaining an output bear from high-power lasers. A proposed solution has been to provide a small aperture located in a metallic mirror through which some of the internally generated radiation is emitted. However, this is not satisfactory since the absence of any reflection at the point of the aperture frequently causes the laser to operate in a transverse mode in which the energy level at the aperture is zero so that little or no energy is transmitted through the aperture. The purpose of the present invention is to provide a novel cavity for a high-power laser which includes a novel means of obtaining a power output.

Accordingly, it is an object of this invention to provide a new and improved high-power laser.

Another object of this invention is the provision of a new and improved power output means for high-power lasers.

A further object of this invention is the provision of a new and improved cavity-defining means for high-power lasers which includes means for providing a power output beam.

It is also an object of this invention to provide a cooled, low absorptivity mirror construction which produces a power output beam.

Briefly, in accord with one embodiment of this invention, I provide a high-power laser which includes a lasing material, means for exciting the material to stimulated emission and means defining a resonant optical cavity which includes means for providing a power output. In general, this invention will be most useful in the case of lasers which produce extremely high power at frequencies which are easily absorbed by semitransparent materials. In accord with this invention, the cavity-defining means includes a pair of opaque reflective members, at least one of which has a surface including a plurality of periodic fluctuations separated by flat regions so that a portion of an incident beam is reflected back upon itself and another portion is diffractively reflected at an angle to the incident beam. In accord with a preferred embodiment, the periodic fluctuations comprise partial grooves in a planar surface. The periodic fluctuations are provided at a spacing determined by the frequency at which the laser oscillates and by the angle at which the diffracted beam is to be reflected. Preferably, the grooves present one major sidewall and one suppressed sidewall so that most of the reflection occurs from the flat regions and from the major sidewalls, thus enhancing the diffraction effect.

Further objects and advantages of this invention will become apparent as the description and illustration thereof proceed.

The invention and its manner of operation will best be understood by a consideration of the following description, in conjunction with the accompanying drawings, in which:

FIG. 1 is a schematic illustration of a high-power laser constructed in accord with this invention;

FIG. 2 is a cross-sectional view of the laser of FIG. 1;

FIG. 3 is a schematic view of a portion of a laser based on an alternative embodiment of this invention; and FIG. 4 is a schematic partial view of an alternative embodiment of this invention.

In FIGS. 1 and 2, a high-power laser constructed in accord with a preferred embodiment of this invention is illustrated. As shown therein, the laser comprises an enclosure 11 which contains the lasing material, for example, carbon dioxide, which may be combined with other ingredients such as nitrogen and helium. The enclosure 11 is sealed by Brewster windows 12 and means for producing an electrical discharge such as electrodes 13 are provided for exciting the material to produce emission. The electrodes 13 are connected to a power supply 14 which may, for example, be a DC source. The Brewster windows permit the transmission of radiation from the enclosure without loss. The enclosure 11 has a generally cylindrical configuration and its axis is aligned with the optical axis of a resonant cavity defined by mirrors 15 and 16. In the illustrated embodiment, mirror 15 is a conventional opaque reflector such as a polished metal disc which can withstand the heating caused by the radiation incident thereon. The mirror 16, constructed in accord with this invention, coaxially reflects a major proportion of incident radiation. In operation, application of electrical energy to the electrodes 13 produces a discharge which in turn causes emission within the lasing material. The reflection of this radiation within the resonant cavity produces stimulated emission and the radiation becomes coherent.

The mirror 16, in accord with this invention, includes means for reflecting a substantial portion of the axially incident radiation back into the resonant cavity along its axis and also for providing a nonaxial power output beam. As may be seen more clearly in FIG. 2, the mirror 16 in a preferred embodiment comprises a metallic body having a generally planar surface 17 including a plurality of periodic fluctuations, specifically grooves 18. The period of the grooves or other fluctuations is defined in the same manner as in the case of a grooved diffraction surface; that is, the distance, $a$, between two identical points in successive fluctuations is defined by the equation:

$$a = n\lambda / \sin \theta$$

where $\lambda$ is the frequency of the radiation emitted by the lasing material, $\theta$ is the angle between the incident beam and the diffracted beam, and $n$ is any integer.

In the normal case, this equation is evaluated for $n=1$ so that the presence of the fluctuations on the surface 17 produces a first order diffracted beam.

In the laser of FIG. 1, it is necessary to arrange the fluctuations and the flat surface 17 in relative proportions so that an appropriate amount of the beam is returned into the cavity to continue the process of stimulated emission. Accordingly, the fluctuations occupy only a limited percentage of the front surface of mirror 16. Most of the incident beam 20, approximately 78 percent in the illustrated embodiment, does not encounter the diffracting fluctuation and is returned directly into the laser. A smaller proportion 21, approximately 20 percent, encounters the diffracting fluctuation and is diverted into the first order beam 22. The remaining 2 percent of the incident beam is absorbed or scattered elsewhere by the mirror.

In accord with the preferred embodiment of this invention, the fluctuations comprise grooves which present a major sidewall 19 to the beam while the other sidewall of the groove is suppressed. The major sidewall is positioned at an angle to the planar surface 17 which is equal to one-half of the angle between the diffracted beam and the incident beam. In this manner, the portion of the incident radiation which strikes the major sidewall is directly reflected in the direction of the diffracted beam. This feature assists in enhancing the desired mode and in suppressing other diffraction modes.

In the illustrated embodiment, the surface has been arranged to return nearly 80 percent of the incident radiation into the lasing material and to direct approximately 20 percent into the output beam. It has been assumed that the lasing material is carbon dioxide and that the output wavelength is 10.6 microns. The angle of the output beam to the incident beam, $\theta$, is 30° and, accordingly, the major sidewall 19 of grooves 18 are disposed at an angle of 15° to the planar surface 17. The spacing of grooves 18 is defined by the previously stated equation. In general, the percentage of the incident radiation returned into the resonant cavity should be between about 60 percent and 90 percent. The exact value in any case depends on the particular parameter of a specific situation.

The laser of the present invention thus avoids the difficulties previously encountered in the extraction of a power output beam from high-power lasers. The mirror 16 is completely reflective at the wavelengths in question and may be constructed of a material such as a metal or a reflective ceramic. The high absorption of energy which occurs in other materials when transmission of a percentage of the long wavelength's infrared radiation is attempted does not occur and in addition, the materials can be selected to withstand the thermal stress which does arise even when essentially all of the radiation is reflected. In addition, apparatus for cooling the back surface of the mirror 16 can be provided without concern for the necessity of transmitting the output beam through this apparatus.

A particularly advantageous and unique feature of this invention is also shown in FIG. 2 in that the mirror 16 may be cooled to whatever extent is required by any suitable means such as cooling channel 23 and flowing coolant 24. Since the output beam does not pass through the mirror in the lasers of this invention, the cooling apparatus is not restricted by the need to permit passage of the beam. Thus, the cooling system chosen can be designed to remove heat from the mirror very quickly and maintain it at a low temperature. This feature is of particular importance since it means that the mirror material can be chosen independently of its melting point. For example, mirrors of copper or aluminum may be selected because of other desired characteristics such as reflectivity or ease of polishing and the cooling system may freely be designed to remove heat so quickly that melting or softening does not occur.

An alternative embodiment of the present invention is illustrated in FIG. 3 wherein a mirror 25 is provided having planar front surface regions 26 and grooves 27 which include major sidewalls 28. In this case, the major sidewalls 28 occupy approximately 80 percent of the front surface of the mirror and the flat surface regions occupy approximately 20 percent. Therefore, a major proportion 29 of the incident radiation is reflected directly into the cavity by the major sidewalls while a smaller proportion 30 encounters the planar surface regions 26 to produce the power output beam 31. This embodiment may be particularly advantageous when it is desired to provide a single frequency laser since the effect of the mirror 25 is to provide coaxial return of only one wavelength while other wavelengths are shifted slightly off axis by the diffracting effect of the grooves 27.

FIG. 4 illustrates another embodiment of this invention wherein a mirror 32 is provided as a defining element of a resonant laser cavity which comprises a planar surface 33 having a plurality of peaks 34. The peaks 34 have the periodicity as defined previously in the case of grooves 18. Since diffraction occurs from any periodic surface fluctuation, the peaks 34 produce exactly the same effect on the incident beam as is the case in the embodiment shown in FIG. 1. A major proportion 35 of the incident beam, for example about 75 percent, is reflected back into the enclosure 11 while a smaller proportion 36, for example 25 percent, is diffracted to form the power output beam 37. The major surfaces 38 of the peaks 34 again assist in selecting the desired diffraction mode and is, therefore, preferred.

While I have shown and described several embodiments of my invention, it will be apparent to those skilled in the art that many changes and modifications may be made without departing from the true spirit and scope of this invention. For example, the surface area ratio may vary over a wide range, depending on the exact conditions and requirements of a particular use. The angle at which the output beam is provided may, of course, vary according to the requirements of a particular case.

A specific embodiment of this invention which may be of particular advantage in some cases is that in which both sidewalls of the fluctuation (either a groove or a peak) are effective to enhance the power of diffracted beams in two different directions. In this case, two coherent output beams are obtained at $+\theta$ and at $-\theta$. In accord with this invention, a major proportion of the surface is perpendicular to the laser axis so that most of the incident radiation is returned into the laser.

Another application of this invention which may be of interest is that of providing for both input and output beams in a laser which is used as an amplifier of a coherent signal from another source. Appropriate surface configurations may be used to reflect the input wave from an angled direction into the laser to control the emission wavelength while the laser proportion of the resonant radiation is reflected coaxially into the laser. Either the same mirror or another of the cavity-defining mirrors may have a surface configuration in accord with this invention to provide an output beam.

Finally, it is noted that the present invention is readily adaptable for use in ring lasers. Also, the concept of this invention may readily be adapted to spherical mirrors by those skilled in the art. Accordingly, it is intended that the appended claims cover all such changes and other modifications as fall within the true spirit and scope of this invention.

I claim:

1. A high-power laser comprising:
   a material capable of producing stimulated emission;
   means for exciting said material to produce stimulated emission at a frequency characteristic of said material and at a power level higher than can be tolerated by mirrors which partially transmit said frequency;
   means defining a resonant optical cavity comprising reflective members opaque to radiation at said frequency, said cavity extending through said material;
   one of said members comprising an opaque reflective surface, said surface including a plurality of periodic fluctuations separated by coplanar flat regions, said surface producing a first reflected beam coaxial with said cavity and a second reflected beam at an angle to said first beam.

2. A laser as claimed in claim 1 wherein said periodicity is defined by the equation:

$$a = n\lambda/\sin\theta$$

where
   $a$ is the length of one cycle,
   $\lambda$ is the wavelength of said characteristic emission,
   $\theta$ is one-half the angle between an incident beam perpendicular to said flat regions and the reflected beam diffracted by said fluctuation, and
   $n$ is any integer.

3. A laser as claimed in claim 2 wherein said fluctuation comprises a surface region disposed at an angle to said flat regions, said angle between said regions being such that an incident beam perpendicular to said flat regions is reflected from said angled region at an angle of $2\theta$ from said incident beam.

4. A laser as claimed in claim 1 wherein said surface comprises a plurality of parallel grooves, one of said beams being reflected from the sidewalls of said grooves and one from said flat regions.

5. A laser as claimed in claim 4 wherein said grooves are separated by said flat regions.

6. A laser as claimed in claim 4 wherein said flat regions form the bottom of said grooves.

7. A laser as claimed in claim 4 wherein a major proportion of said surface is included in said flat regions, said first beam being reflected from said flat regions.

8. A laser as claimed in claim 4 wherein a major proportion of said surface contains said grooves, said first beam being reflected from a sidewall of said grooves.

9. A laser as claimed in claim 1 wherein said reflective members comprise metallic bodies.

10. A high-power laser for continuously producing an extremely high energy beam of radiation comprising:
a material capable of producing stimulated emission;
means of exciting said material to produce stimulated emission at a frequency characteristic of said material and at a power level higher than can be tolerated by a reflective body;
means defining a resonant optical cavity comprising reflective embers opaque to radiation at said frequency, said cavity extending through said material
means adjacent to the back surface of said reflective members for removing heat at a rate at least equal to the rate of heat input from said stimulated emission;
one of said members comprising an opaque reflective surface, said surface including a plurality of periodic fluctuations separated by coplanar flat regions, said surface producing a first-reflected beam coaxial with said cavity and a second reflected beam at an angle to said first beam.

11. A laser as claimed in claim 10 wherein said reflective members comprise opaque metallic bodies and wherein the back surfaces of said members are immersed in a forced-flow coolant stream.

12. A laser as claimed in claim 11 wherein said reflective members comprise a reflective metallic front surface.

13. A high-power laser comprising:
a material capable of producing stimulated emission;
means for exciting said material to produce stimulated emission at a frequency characteristic of said material and at a power level higher than can be tolerated by mirrors which partially transmit said frequency;
means defining a resonant optical cavity comprising reflective members opaque to radiation at said frequency, said cavity extending through said material;
one of said members comprising an opaque reflective surface, said surface including a plurality of periodic fluctuations comprising peaks separated by coplanar flat regions, said surface producing a first reflected beam coaxial with said cavity and a second reflected beam at an angle to said first beam;
said peaks having periodicity defined by the equation:

$$a = n\lambda/\sin\theta$$

where
$a$ is the length of one cycle,
$\lambda$ is the wavelength of said characteristic emission,
$\theta$ is one-half the angle between an incident beam perpendicular to said flat regions and the reflected beam diffracted by said fluctuation, and
$n$ is any integer.